May 15, 1923.  
E. V. ALLEN  
AUTOMOBILE BUMPER  
Original Filed Nov. 4, 1921
1,455,514
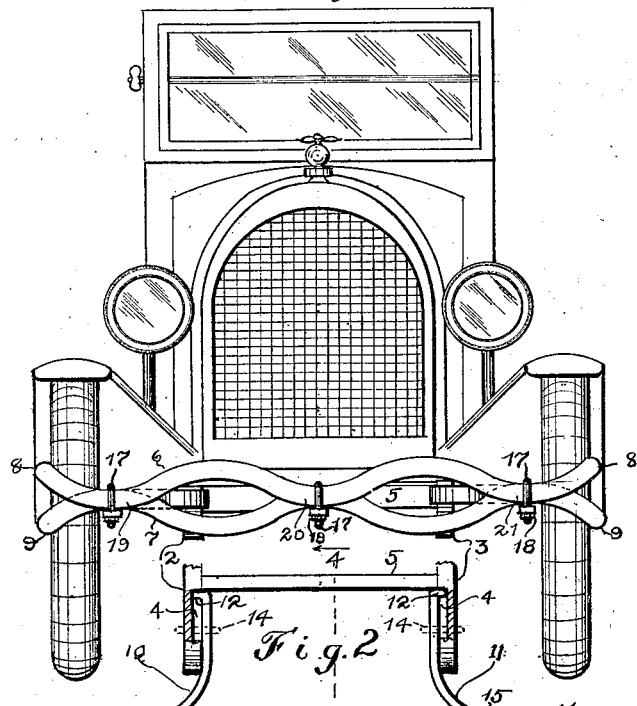
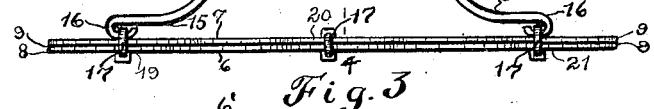
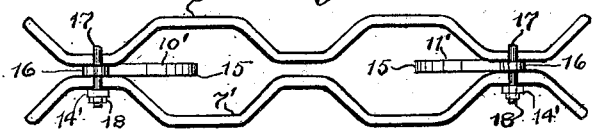
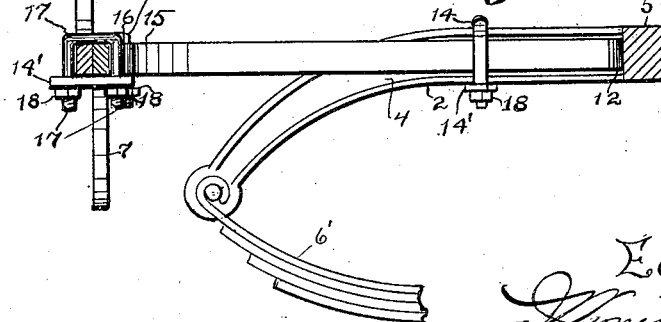
INVENTOR.  
Edward V. Allen  
BY  
ATTORNEY.

Patented May 15, 1923.

1,455,514

UNITED STATES PATENT OFFICE.

EDWARD V. ALLEN, OF WAUKEGAN, ILLINOIS.

AUTOMOBILE BUMPER.

Application filed November 4, 1921, Serial No. 512,774. Renewed March 19, 1923.

*To all whom it may concern:*

Be it known that I, EDWARD V. ALLEN, a citizen of the United States, residing at Waukegan, in the county of Lake and State of Illinois, have invented certain new and useful Improvements in Automobile Bumpers, of which the following is a specification.

My invention relates to fenders, bumpers and like protective devices for self-propelling vehicles, and its general object is to remedy defects of construction and arrangement as well as defects in the protective properties of existing types of bumpers. Another object is to provide a spring-supported or cushioned bumper which is arranged to form substantially a yielding continuation of the frame itself of the vehicle, so far as its power of resistance to impacts is concerned, without being actually an integral part of said vehicle, or which, in other words, does not depend wholly upon the shearing strength or resistance of the usual bolt or clamp fasteners which are so frequently broken in minor collisions making it necessary to carry the fender within the passenger space of the machine and being without its protection until replaced. A still further object of this invention is to provide protection in front of the wheels and the wheel spindles, or the corners of the machine, substantially equal to that provided for the intermediate portions or the radiator area, it having been found that these corner and wheel portions are the most frequently wrecked owing to the partial veering off to one side in the effort to avoid a threatened collision.

And the invention consists in the novel construction, combination and arrangement of parts hereinafter described in detail, illustrated in the accompanying drawing and more particularly pointed out in the appended claims.

In the drawing—

Figure 1 is a front end view of the outlines of an automobile, with my invention applied thereto.

Figure 2 is a plan view of the bumper together with a broken away portion of the automobile frame rails to which said bumper is attached.

Figure 3 is a front view of a modification adapted for bars round or rectangular in cross section.

Figure 4 is an enlarged section taken substantially on the line 4—4 of Figure 2.

In the several views 2 and 3 represent the well known forwardly and downwardly projecting spring-supporting extensions of the side-rails of the usual automobile-frame to which bumpers are commonly bolted in such a manner as to be frequently sheared off. These extensions or "horns" are usually of channel-bar form, with the channels—4—facing each other, or on the inside. The extensions are forwardly of the cross-bar—5 of the frame, each usually supporting one end of a spring 6'.

In the present improvement the channels 4 as well as the frame-bar 5 are utilized to provide more substantial support than heretofore for the forward reaches or arms of the bumper, and the latter is in the form of a series of opposing curves or bends of flat bars 6 and 7 that are reversely curved edgewise in a vertical plane making a series of "waves" one of which bars terminates in upwardly inclined "horns" 8 while the other terminates in similar, but downwardly inclined, horns or ends 9. The projections 8 and 9 that are coextensive in lateral projection and protection with the intermediate portions of the bumper. The bumper-bars are in both forms of construction supported upon and secured to arms 10 and 11 in the Figures 1 and 2 construction and similar arms 10' and 11' in the modified, or Figure 3, construction. Each arm terminates at its inner end in a foot or right angle lug 12 which bears against and parallels the front rail frame 5 as shown in Figures 2 and 4. These arms are secured to the rail projections 2 and 3 by double or U bolts 14, passing through the usual washer strap 14' and provided with nuts 18. These U-bolts and strap embrace the frame projections and the bumper arms and hold them against accidental displacement, but do not, like the bolts in ordinary constructions, bear the strains of a collision, such strains being in the present instance substantially longitudinally of the side-frame rails of the vehicle. The forward portion of each of said arms is in the form of an outward and horizontal curve 15 terminating in a loop or eye 16 which embraces one leg of a U-bolt 17, as shown in Figures 2, 3 and 4.

In Figures 1 and 2 the flat bars 6 and 7 overlie each other side-ways at 19, 20 and 21 while in Figure 3 the bars 6' and 7' are spaced apart vertically to the extent of the thickness of the loop 16 which is interposed between the end-bends of the bumper and curved toward each other.

I claim as my invention—

1. The combination with the channeled side and with the front frame-rails of an automobile, of bumper-supporting arms which are supported against impacts by said front rail and supported against lateral movement in the channels of said side-rails, and a bumper clamped to said arms.

2. The combination with the projecting horns of an automobile frame side and with the front rail, of arms having their ends bearing against said front rails and imparting strains of bumper impacts thereto, clamps removably securing said arms to said side rails against lateral movement, and means for securing bumper bars to said arms.

3. The combination with the forwardly projecting portions of the frame side rails and with the front rail, of a pair of arms having feet or lugs paralleling and bearing against said front rail and having also outwardly from each other curved forward portions, means on the latter for securing a bumper thereto, and means for securing said arms to said forwardly projecting portions.

4. The combination with the channels in the forward projections of automobile frame rails and the front cross-bar rail of said frame, of bumper-supporting arms having inner ends bearing loosely against said front cross-bar rail and means securing said arms in the channels in the sides of said forward projections.

5. The combination with the forwardly projecting frame portions and the front cross-bar of the automobile frame, of a pair of arms having inner ends bent out at right angles to form feet or lugs which bear against said front cross-bar, said arms having on their outer ends parts adapted to be engaged by U-bolt clamps, a pair of oppositely curved bars secured at meeting curve portions to said clamps, and means clamping said arms to said projecting frame portions.

6. The combination with an automobile frame, of a bumper consisting of a pair of bars formed with upward and downward curves, the downward curves of one bar meeting the upward curves of the other bar intermediate of the ends of said bars, said ends being oppositely inclined at an upward and downward angle, respectively, means for clamping said bars together at their meeting portions, a pair of supporting arms having loops or eyes at their outer ends adapted to be engaged by said clamping means, and means for clamping together said arms and the side-rails of said frame.

In testimony whereof I have hereunto signed my name.

EDWARD V. ALLEN.